United States Patent [19]

Povarov et al.

[11] 3,899,492
[45] Aug. 12, 1975

[54] PROCESS FOR THE PRODUCTION OF SUBSTITUTED 1,2-DIHYDROQUINOLINES

[76] Inventors: Leonard Sergeevich Povarov, ulitsa Krasikova, 7/43, korpus 3, kv.28; Boris Mikhailovich Mikhailov, ulitsa Vavilova, 55, kv.85, both of Moscow, U.S.S.R.

[22] Filed: Oct. 17, 1972

[21] Appl. No.: 298,280

Related U.S. Application Data

[63] Continuation of Ser. No. 834,860, June 19, 1969, abandoned.

[52] U.S. Cl. .... 260/283 SY; 260/287 R; 260/289 R
[51] Int. Cl. .............................. C07d 33/18
[58] Field of Search ....... 260/283 SY, 283 R, 287 R

[56] References Cited
UNITED STATES PATENTS
2,451,611  10/1948  Campbell...................... 260/283 SY

OTHER PUBLICATIONS
Elderfield, Heterocyclic Compounds, Vol. 4, pp. 14–15, 276–277, (1952).

Povarov et al. I, Chem. Abstr., Vol. 61, Col. 13290, (1964), (abstracting USSR, 163, 181).
Povarov et al. II, Chem. Abstr., Vol. 61, Col. 16052, (1964), (abstracting USSR, 163, 180).
Povarov et al. III, Chem. Abstr., Vol. 62, Col. 72239, (1965).
Povarov et al. IV, Chem. Abstr., Vol. 60, Col. 5451, (March 1964).

*Primary Examiner*—Donald G. Daus
*Attorney, Agent, or Firm*—Holman & Stern

[57]  ABSTRACT

Production of substituted 1,2-dihydroquinolines by reacting aromatic amines with isopropenyl alkyl ethers of the general formula

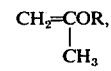

where R is alkyl having 1–5 carbon atoms, in the presence of a Lewis acid as catalyst, in a neutral organic solvent which contains no active groups.

10 Claims, No Drawings

PROCESS FOR THE PRODUCTION OF SUBSTITUTED 1,2-DIHYDROQUINOLINES

This is a continuation of application Ser. No. 834,860, filed June 19, 1969, now abandoned.

The present invention relates to processes for the production of nitrogen-containing heterocyclic compounds and, more particularly, to a process for the production of substituted 1,2-dihydroquinolines, specifically derivatives of 2,2,4-trimethyl-1,2-dihydroquinoline containing in position 6 of the benzene ring such substituents as alkyl, isoalkyl, aryl, benzo, acyl, alkoxy, acylhydroxy, acylamino, halogen, nitro, etc, for example, 6-ethoxy-2,2,4-trimethyl-1,2-dihydroquinoline. Compounds of this type are employed as antioxidants, stabilizers and herbicides.

Processes for the production of substituted 1,2-dihydroquinolines are known which comprise reacting aromatic amines with acetone in the presence of such catalysts as iodine, bromine, benzenesulphonic acid, toluenesulphonic acid or sulphanilic acid. Thus, one compound of this type, 6-ethoxy-2-2-4-trimethyl-1,2-dihydroxyquinoline, is produced by passing, for a period of 5 (hrs.) a tenfold excess of acetone through p-phenetidine heated to 170°–175°C. The catalyst is sulphanilic acid taken in the amount of 8% by weight.

The above known process suffers a number of disadvantages: the use of high temperature which leads to side reactions, e.g. resinification and demethylation; consumption of large amounts of catalyst and difficulty involved in separating the same from the final product; and large consumption of acetone.

It is an object of the present invention to provide a new process for the production of substituted 1,2-dihydroquinolines which requires no power consumption and can be carried out in mild conditions.

This object has been accomplished by the provision of a process, wherein, according to the invention, aromatic amines are reacted with isopropenyl alkyl ethers of the general formula $$CH_2=\underset{\underset{CH_3}{|}}{C}OR$$

where R is alkyl having 1–5 carbon atoms in the presence of a catalyst which is a Lewis acid, the reaction being carried out in a neutral organic solvent which does not contain chemically active groups. Isopropenyl ethyl ether is preferably employed as the isopropenyl alkyl ether. In order to obtain the final product in maximum yield the ratio of aromatic amines to isopropenyl alkyl ether is preferably 1:4. The reaction proceeds more rapidly if the catalyst is taken in the amount of 1–10% of the aromatic amine by weight.

Of the Lewis acids, boron fluoride etherate, $BF_3 \cdot O(C_2H_5)_2$, or aluminium bromide, $AlBr_3$, is preferably used as the catalyst. Preferred solvents are benzene, ethyl acetate and chloroform.

The process is embodied as follows.

Into a reaction flask fitted with a thermometer, a stirrer and a dropping funnel are placed an aromatic amine in an organic solvent, e.g., benzene, ethyl acetate or chloroform. To the solution is added the catalyst, a Lewis acid, in an amount of 1–10% of the aromatic amine by weight. While stirring the reaction mixture, an isopropenyl alkyl ether is slowly added at room temperature or at a temperature of 35°C.

A reaction thereupon begins with the evolution of heat. The amine is first added to the unsaturated ether at the double bond with the formation of an unstable intermediate product which then loses a molecule of alcohol, thus forming the anil of a ketone. The ketone anil reacts with a second molecule of unsaturated ether in a diene synthesis reaction with the formation of an unstable derivative of 4-alkoxy-2,2,3,4-tetrahydroquinoline. The latter loses a molecule of alcohol in the conditions of the reaction to form the final product a derivative of 1,2-dihydroquinoline. Thus, the reactions occur as follows

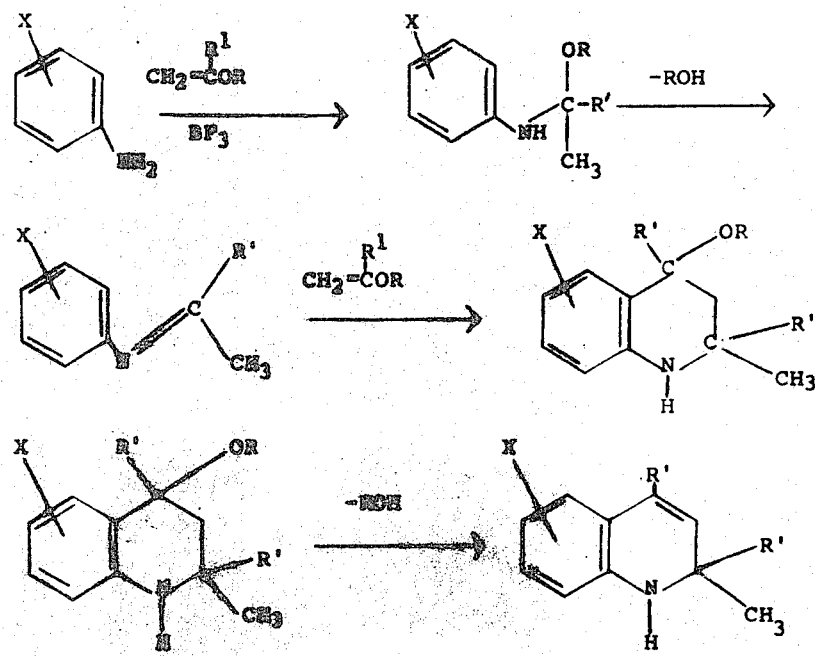

where
is alkyl, isoalkyl, aryl, acyl, alkoxy, acylhydroxy, acylamino, halogen, nitro, etc;

R and R' are alkyl with 1–5 carbon atoms.

The alcohol formed in the reaction combines with the excess unsaturated ether to form a ketal which can easily be split into isopropenyl alkyl ether and alcohol:

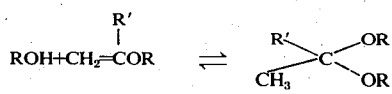

At the end of the reaction which continues 2–3 hr the reaction mixture is washed with 10% NaOH, dried over $MgSO_4$ and the final product isolated by fractional distillation in vacuo.

The advantages of the present invention are the following: reduction of the time required for the process, carrying out the process at room temperature or at 35°C and the use of small amounts of catalyst which can easily be removed from the reaction product or neutralized in it.

For a better understanding of the present invention by those skilled in the art, the following examples are given by way of illustration.

EXAMPLE 1

Preparation of 6-ethoxy-2,2,4-trimethyl-1,2-dihydroquinoline

To a solution of 13.7 g (0.1 mole) of p-phenetidine in 50 ml of benzene are added 2 g of boron fluoride etherate, $BF_3.O(C_2H_5)_2$, after which 25.8 g (0.3 mole) of isopropenyl ethyl ether is added with stirring. Due to the exothermic reaction the temperature of the reaction mixture rises to 52°C. The mixture is stirred for about 1 hr, after which it is washed with 10% NaOH and dried over $MgSO_4$. Fractionation of the reaction products gives 14 g (64.5%) of 6-ethoxy-2,2,4-trimethyl-1,2-dihydroquinoline; b.p. 118°–123°C (1 mm); $n_D^{20}$ 1.5592.

Found, %: C, 77.43; H, 8.89, 8.86.
Calculated for $C_{14}H_{19}NO$, %: C, 77.38; H, 8.98.

EXAMPLE 2

Preparation of 6-methoxy-2,2,4-trimethyl-1,2-dihydroquinoline

To a solution of 12.3 g (0.1 mole) of p-anisidine in 25ml of benzene is added 1 ml of boron fluoride etherate, $BF_3.O(C_2H_5)_2$, and then 25.8 g (0.3 mole) of isopropenyl ethyl ether. The temperature of the reaction mixture rises to 48°C and the flask is slightly cooled with water. 2 hours after the addition of the ether the reaction mixture is treated as in Example 1. Fractionation of the reaction products gives 11.5 g (56.6%) of 6-methoxy-2,2,4-trimethyl-1,2-dihydroquinone; b.p. 110°–113°C (1.5 mm); $n_D^{20}$ 1.5658.

Found %: C, 76.91; 77.10; H, 8.81; 8.56.
Calculated for $C_{13}H_{17}NO$, %: C, 76.81; H, 8.43.

EXAMPLE 3

Preparation of 2,2,4-trimethyl-5,6-benzo-1,2-dihydroquinoline

To 75 g (0.5 mole) of β - naphthylamine dissolved in 500 ml of ethyl acetate are added 5 ml of boron fluoride etherate, $BF_3.O(C_2H_5)_2$. At a temperature of 27°C 170 g (2 moles) of isopropenyl ethyl ether are added dropwise to the mixture. The reaction begins at once and proceeds with the evolution of heat. Ether is added at such a rate that the temperature does not rise above 45°C. The mixture is then stirred for 30 min after which it is washed with 10% NaOH and dried over $MgSO_4$. Distillation of the reaction products gives 103 g (92%) of 2,2,4-trimethyl-5,6-benzo-1,2-dihydroquinoline; b.p. 134°–136°C (1.5 mm); $n_D^{20}$ 1.6730.

Found, %: C, 85.42; 85.52; H, 7.99, 8.00.
Calculated for $C_{16}H_{17}NO$, %: C, 86.06; H, 7.67.

EXAMPLE 4

To a solution of 27.4 g (0.2 mole) of p-phenetidine in 100 ml of chloroform are added 3 g of $AlBr_3$ and then 68.8 g (0.8 mole) of isorpropenyl ethyl ether. The mixture obtained is treated as in Example I.

Yield of 6-ethoxy-2,2,4-trimethyl-I,2-dihydroquinoline is 26.9 g (62 %).

What we claim is:

1. A process for the production of 2,2,4-trimethyl-1,2-dihydroquinolines or benzoquinolines which consists of reacting 3-naphthylamine or an aniline of the formula

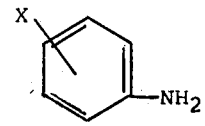

wherein X is in the 3 or 4 position and is selected from the group consisting of primary or secondary alkyl of 1 to 5 carbon atoms, alkoxy of 1 to 4 carbon atoms, halogen or phenyl, with an isopropenyl ether of the formula

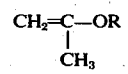

wherein R is primary alkyl of 1 to 5 carbon atoms in the presence of a catalyst selected from the group consisting of $AlBr_3$ and $BF_3.O(C_2H_5)_2$ and a solvent selected from the group consisting of benzene, ethyl acetate and chloroform.

2. A process as claimed in claim 1, wherein isopropenyl ethyl ether is employed as the isopropenyl alkyl ether.

3. A process as claimed in claim 1, wherein the molar ratio of aromatic amine to isopropenyl alkyl ether is 1:4.

4. A process as claimed in claim 1, wherein the catalyst is employed in the amount of 1–10% of the aromatic amine by weight.

5. A process as claimed in claim 1, wherein the catalyst employed is boron fluoride etherate.

6. A process as claimed in claim 1, wherein the catalyst employed is aluminum bromide, $AlBr_3$.

7. A process as claimed in claim 1, wherein the solvent is benzene.

8. A process as claimed in claim 1, wherein the solvent is ethyl acetate.

9. A process as claimed in claim 1, wherein the solvent is chloroform.

10. A process as claimed in claim 1, wherein the reaction is carried out at about room temperature.

* * * * *